United States Patent
Hamadeh et al.

(10) Patent No.: US 12,423,827 B1
(45) Date of Patent: Sep. 23, 2025

(54) IMAGE SEGMENTATION WITH OBJECT BOUNDARY REFINEMENT

(71) Applicant: Scale AI, Inc., San Francisco, CA (US)

(72) Inventors: Saleh Hamadeh, San Francisco, CA (US); Andrew Kondrich, San Francisco, CA (US); Xianming Li, San Francisco, CA (US); Thomas Isaac Liao, Moraga, CA (US); Hongbo Tian, Orpington (GB)

(73) Assignee: Scale AI, Inc., San Francisco, CA (US)

( * ) Notice: Subject to any disclaimer, the term of this patent is extended or adjusted under 35 U.S.C. 154(b) by 689 days.

(21) Appl. No.: 17/686,257

(22) Filed: Mar. 3, 2022

Related U.S. Application Data

(60) Provisional application No. 63/271,031, filed on Oct. 22, 2021.

(51) Int. Cl.
*G06T 7/136* (2017.01)
*G06T 7/12* (2017.01)
*G06T 7/13* (2017.01)

(52) U.S. Cl.
CPC .................. *G06T 7/13* (2017.01); *G06T 7/12* (2017.01); *G06T 2207/20081* (2013.01); *G06T 2207/20092* (2013.01)

(58) Field of Classification Search
None
See application file for complete search history.

(56) References Cited

U.S. PATENT DOCUMENTS

| | | | |
|---|---|---|---|
| 2019/0266418 A1* | 8/2019 | Xu | G06V 10/457 |
| 2020/0380675 A1* | 12/2020 | Golden | G06T 7/194 |
| 2021/0027471 A1* | 1/2021 | Cohen | G06T 7/90 |
| 2021/0027546 A1* | 1/2021 | Hao | G06T 19/20 |

FOREIGN PATENT DOCUMENTS

WO WO-0139123 A1 * 5/2001 .............. G06K 9/38

OTHER PUBLICATIONS

Dai, Jifeng, Kaiming He, and Jian Sun. "Boxsup: Exploiting bounding boxes to supervise convolutional networks for semantic segmentation." Proceedings of the IEEE international conference on computer vision. 2015. (Year: 2015).*

(Continued)

*Primary Examiner* — Sean M Conner
(74) *Attorney, Agent, or Firm* — Squire Patton Boggs LLP; Sarah Mirza

(57) ABSTRACT

Embodiments of the present invention set forth techniques for image segmentation with object boundary refinement. In some embodiments, the techniques include receiving an image and an indication of a region within the image, wherein the region includes an object, determining, by a machine learning model, a boundary of the object within the region; receiving a boundary parameter; and determining a portion of the region that includes the object, the determining of the portion of the region being based on the boundary and the boundary parameter. In some embodiments, the machine learning model generates a per-pixel score for each pixel of the region, each per-pixel score indicating a likelihood that the pixel is included in the object, and the boundary parameter includes a score threshold applied to the per-pixel scores to determine the pixels that are included in the portion of the region.

9 Claims, 12 Drawing Sheets

(56) References Cited

OTHER PUBLICATIONS

Ren, Shaoqing, et al. "Faster R-CNN: Towards real-time object detection with region proposal networks." IEEE transactions on pattern analysis and machine intelligence 39.6 (2016): 1137-1149. (Year: 2016).*

Rother, Carsten, Vladimir Kolmogorov, and Andrew Blake. ""GrabCut" interactive foreground extraction using iterated graph cuts." ACM transactions on graphics (TOG) 23.3 (2004): 309-314. (Year: 2004).*

Sofiiuk, Konstantin, Ilia A. Petrov, and Anton Konushin. "Reviving Iterative Training with Mask Guidance for Interactive Segmentation." arXiv preprint arXiv:2102.06583 (2021). (Year: 2021).*

Wu, Zhihuan, et al. "Semantic segmentation of high-resolution remote sensing images using fully convolutional network with adaptive threshold." Connection Science 31.2 (2019): 169-184. (Year: 2019).*

* cited by examiner

IMAGE SEGMENTATION WITH OBJECT BOUNDARY REFINEMENT

CROSS-REFERENCES TO RELATED APPLICATIONS

This application claims the priority benefit of United States provisional application titled, "SEMANTIC SEGMENTATION WITH MACHINE LEARNING-ASSISTED WORKFLOWS," filed on Oct. 22, 2021, and having Ser. No. 63/271,031. The subject matter of this related application is hereby incorporated herein by reference.

BACKGROUND

Technical Field

Embodiments of the present disclosure relate generally to image segmentation and, more specifically, to image segmentation with object boundary refinement.

Description of the Related Art

Advances in the field of machine learning and increases in computing power have led to machine learning models that are capable of segmenting an image into portions that include different objects. For example, an image of a street scene can be segmented into portions that each depict a vehicle, a pedestrian, or a traffic control signal such as a stop sign. Segmentation is typically performed by determining the pixels of the image that belong to each object, such as the pixels within a boundary that delineates the object from other objects and the background of the image. The boundary can be affected by properties such as the distance of the vehicle from the camera that captured the image, the orientation of the vehicle with respect to the camera, and a partial occlusion of the object by another object. Further, some machine learning models are capable of classifying the image into various one of several object types in an object type set. For example, in addition to determining that a portion of the image includes a vehicle, the machine learning model can classify the vehicle into a vehicle type, such as a car, a bus, or a motorcycle.

Machine learning models that perform object segmentation are often generated based on a data sample set that includes a set of images and, for each image, an identification of one or more portions of the image that include an object. For example, a user interface enables a user to draw boundaries around the objects within an image. The user-drawn boundaries operate as ground-truth labels of a data sample set. The machine learning model is trained to determine boundaries within each image that correspond to the boundaries drawn by the user. Optionally, the user interface also permits the user to indicate an object type of the object within each boundary. The user-indicated object types operate as ground-truth labels of the data sample set. In such instances, the machine learning model is trained to classify the object within each portion, such that the classifications determined by the machine learning model correspond to the object types indicated by the user.

Image segmentation is used in a wide variety of applications, such as computer vision, autonomous vehicle control, and industrial automation. In these and other scenarios, the accuracy of the determined boundary can be important. For example, in autonomous vehicle control, a difference of a few pixels in the determined boundary of a pedestrian within an image can alter a prediction of whether the current trajectory of the vehicle would collide with the pedestrian. As another example, in industrial automation, a difference of a few pixels in the determined portion of a boundary of a manufactured item within an image can affect the ability of a robotic arm of an assembly line to pick up the manufactured item. As yet another example, in computer vision, a difference of a few pixels in the determined boundary of an object within an image can affect the classification of an object type or determined property of the object.

Determinations of the boundaries of objects can be affected by many factors. For example, due to the visual perspective of the camera or visual artifacts such as glare, smoke, or reflections, the visual boundary of an object can appear to be inaccurate or distorted relative to its actual boundary. As another example, due to limitations of a camera that captured the image, such as resolution, color depth, low-light sensitivity, dynamic range, or image compression, a boundary of an object within an image can be unclear or ambiguous. As yet another example, an image in which a first object is partially occluded by a second can make it difficult to determine whether a portion of the image that is between the two objects is part of the first object or the second object. Due to these and other factors, machine learning models can incorrectly determine the boundaries of some objects within an image.

As the foregoing illustrates, what is needed in the art are improved techniques for image segmentation with object boundary refinement.

SUMMARY

In some embodiments, a computer-implemented method includes receiving an image and an indication of a region within the image, wherein the region includes an object, determining, by a machine learning model, a boundary of the object within the region, receiving a boundary parameter, and determining a portion of the region that includes the object, the determining of the portion of the region being based on the boundary and the boundary parameter.

In some embodiments, a computer-implemented method includes receiving an image and a boundary of an object within the image, and training a machine learning model to determine the boundary of the object within the image, the determining of the boundary being based on a received boundary parameter.

In some embodiments, a system includes a memory that stores instructions, and a processor that is coupled to the memory and, when executing the instructions, is configured to receive an image and an indication of a region within the image, wherein the region includes an object, determine, by a machine learning model, a boundary of the object within the region, receive a boundary parameter, and determine a portion of the region that includes the object, the determining of the portion of the region being based on the boundary and the boundary parameter.

In some embodiments, one or more non-transitory computer-readable media store instructions that, when executed by one or more processors, cause the one or more processors to perform the steps of receiving an image and an indication of a region within the image, wherein the region includes an object, determining, by a machine learning model, a boundary of the object within the region, receiving a boundary parameter, and determining a portion of the region that includes the object, the determining of the portion of the region being based on the boundary and the boundary parameter.

At least one technical advantage of the disclosed techniques is the determination of boundaries of objects with greater accuracy (e.g., greater per-pixel accuracy). The use of a received boundary parameter enables determinations of the portions of the image that include the object that are more specific to the visual features of the object. Further, boundary determinations are less susceptible to errors due to visual artifacts, limitations of the camera, and/or partial occlusion. Finally, the use of a received boundary parameter to determine the portion of the image provides an additional feature for enabling a user to label images that can be used for training or retraining the machine learning model to meet various performance indicators, such as precision or recall. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Figure 1:
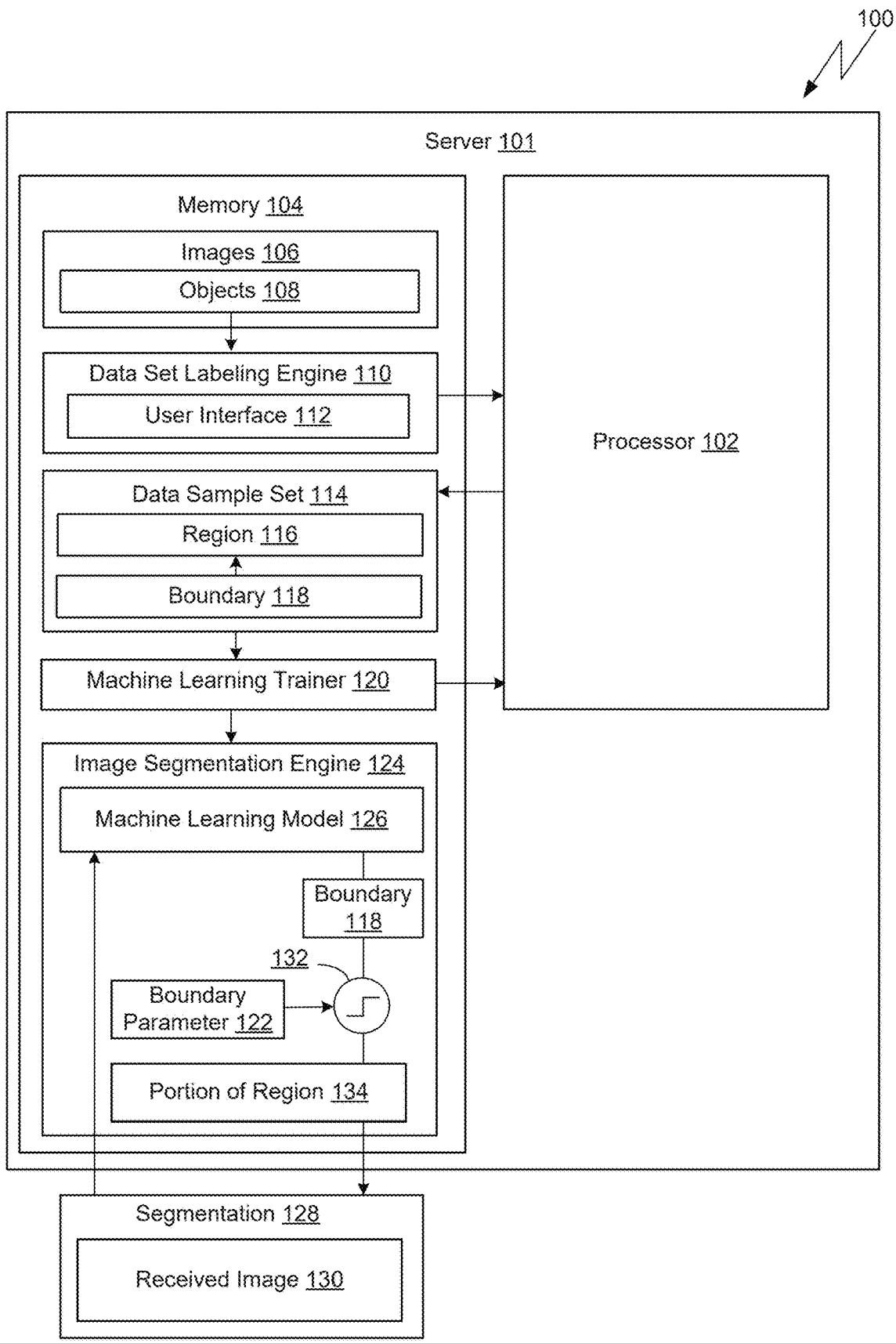
FIG. 1 is a system configured to implement one or more embodiments.

FIG. 1 is a system 100 configured to implement one or more embodiments. As shown, a server 101 within system 100 includes a processor 102 and a memory 104. The memory 104 includes a set of images 106, a data set labeling engine 110 that includes a user interface 112, a data sample set 114, a machine learning trainer 120, and an image segmentation engine 124 that includes a machine learning model 126 and a boundary parameter 122.

Each of the images 106 includes one or more objects 108. The objects 108 can be, for example, vehicles, buildings, pedestrians, or the like. Some of the objects 108 might be partially occluded by other objects 108.

As shown, the data set labeling engine 110 is a program stored in the memory 104 and executed by the processor 102 to label the images 106. In some embodiments, the user interface 112 shows each image 106 to a user and receives user input from the user. The data set labeling engine 110 uses the user input to determine, for each image 106, at least one region 116 and at least one boundary 118 within the region 116. The data set labeling engine 110 stores a data sample set 114 including the at least one region 116 and the at least one boundary 118 for each image 106.

The data sample set 114 includes one or more regions 116 of the image 106, wherein each region 116 includes at least a portion of at least one object 108. Each region 116 can be, for example, a cropped portion of an image 106 that has been determined to include at least one object 108.

The data sample set 114 includes a boundary 118 for each region 116. The boundary 118 separates an area of the region 116 that depicts an object 108 from other areas of the region 116, such as areas depicting other objects or areas depicting a background of the image 106.

The machine learning trainer 120 trains a machine learning model 126 based on the data sample set 114. The training teaches the machine learning model 126 to determine, for at least one region 116 of the data sample set 114, the same or similar boundary 118 as the boundary 118 associated with the region 116 in the data sample set 114.

As shown, the machine learning trainer 120 is a program stored in the memory 104 and executed by the processor 102 to train the machine learning model 126 to determine the boundaries 118 of each of the objects 108 in each of the images 106. In some embodiments, the machine learning trainer 120 compares the boundary 118 associated with each region 116 in the data sample set 114 with a boundary 118 determined by the machine learning model 126 for each region 116 of the data sample set 114. The machine learning trainer 120 trains the machine learning model 126 until the predicted boundary 118 for each region 116 of the data sample set 114 is within an acceptable range of accuracy of the boundary 118 associated with the region 116 in the data sample set 114.

As shown, the image segmentation engine 124 is a program stored in the memory 104 and executed by the processor 102 to determine portions 134 of received images 130 that include one or more objects 108. The image segmentation engine 124 uses the trained machine learning model 126 to determine boundaries 118 of one or more objects 108 in a received image 130. Based on each boundary 118, the image segmentation engine 124 determines a portion 134 of the image 106 that includes an object 108, such as a subset of pixels of the region 116 that are included in the boundary 118. In particular, the image segmentation engine 124 receives a boundary parameter 122 and determines the portion 134 of the image 106 by based on the boundary parameter 122. The boundary parameter 122 determines the portion of each region 116 that includes the object 108. The image segmentation engine 124 applies an operation 132 to process the boundary 118 and the boundary parameter 122 to determine the portion 134 of the region. In some embodiments, the boundary parameter 122 includes a score threshold to be applied to per-pixel scores of the pixels of the region 116, and the operation 132 includes applying the score threshold to the per-pixel scores to determine which pixels are included in the object 108.

Some embodiments of the disclosed techniques include different architectures than as shown in FIG. 1. As a first such example and without limitation, various embodiments include various types of processors 102. In various embodiments, the processor 102 includes a CPU, a GPU, a TPU, an ASIC, or the like. Some embodiments include two or more processors 102 of a same or similar type (e.g., two or more CPUs of the same or similar types). Alternatively or additionally, some embodiments include processors 102 of different types (e.g., two CPUs of different types; one or more CPUs and one or more GPUs or TPUs; or one or more CPUs and one or more FPGAs). In some embodiments, two or more processors 102 perform a part of the disclosed techniques in tandem (e.g., each CPU training the machine learning model 126 over a subset of the data sample set 114). Alternatively or additionally, in some embodiments, two or more processors 102 perform different parts of the disclosed techniques (e.g., one CPU executing the machine learning trainer 120 to train the machine learning model 126, and one CPU executing the image segmentation engine 124 to determine the boundaries 118 of objects 108 in images using the trained machine learning model 126).

As a second such example and without limitation, various embodiments include various types of memory 104. Some embodiments include two or more memories 104 of a same or similar type (e.g., a Redundant Array of Disks (RAID) array). Alternatively or additionally, some embodiments include two or more memories 104 of different types (e.g., one or more hard disk drives and one or more solid-state storage devices). In some embodiments, two or more memories 104 distributively store a component (e.g., storing the data sample set 114 to span two or more memories 104). Alternatively or additionally, in some embodiments, a first memory 104 stores a first component (e.g., the data sample set 114) and a second memory 104 stores a second component (e.g., the machine learning trainer 120).

As a third such example and without limitation, some disclosed embodiments include different implementations of the machine learning trainer 120 and/or the image segmentation engine 124. In some embodiments, at least part of the machine learning trainer 120 and/or the image segmentation engine 124 is embodied as a program in a high-level programming language (e.g., C, Java, or Python), including a compiled product thereof. Alternatively or additionally, in some embodiments, at least part of the machine learning trainer 120 and/or the image segmentation engine 124 is embodied in hardware-level instructions (e.g., a firmware that the processor 102 loads and executes). Alternatively or additionally, in some embodiments, at least part of the machine learning trainer 120 and/or the image segmentation engine 124 is a configuration of a hardware circuit (e.g., configurations of the lookup tables within the logic blocks of one or more FPGAs). In some embodiments, the memory 104 includes additional components (e.g., machine learning libraries used by the machine learning trainer 120 and/or image segmentation engine 124).

As a fourth such example and without limitation, instead of one server 101, some disclosed embodiments include two or more servers 101 that together apply the disclosed techniques. Some embodiments include two or more servers 101 that distributively perform one operation (e.g., a first server 101 and a second server 101 that respectively train the machine learning model 126 over different parts of the data sample set 114). Alternatively or additionally, some embodiments include two or more servers 101 that execute different parts of one operation (e.g., a first server 101 that displays an image segmentation engine 124 for a user, and a second server 101 that executes the back-end operations of the image segmentation engine 124). Alternatively or additionally, some embodiments include two or more servers 101 that perform different operations (e.g., a first server 101 that trains the machine learning model 126, and a second server 101 that executes the image segmentation engine 124). In some embodiments, two or more servers 101 communicate through a localized connection, such as through a shared bus or a local area network. Alternatively or additionally, in some embodiments, two or more servers 101 communicate through a remote connection, such as the Internet, a virtual private network (VPN), or a public or private cloud.

Figure 2:
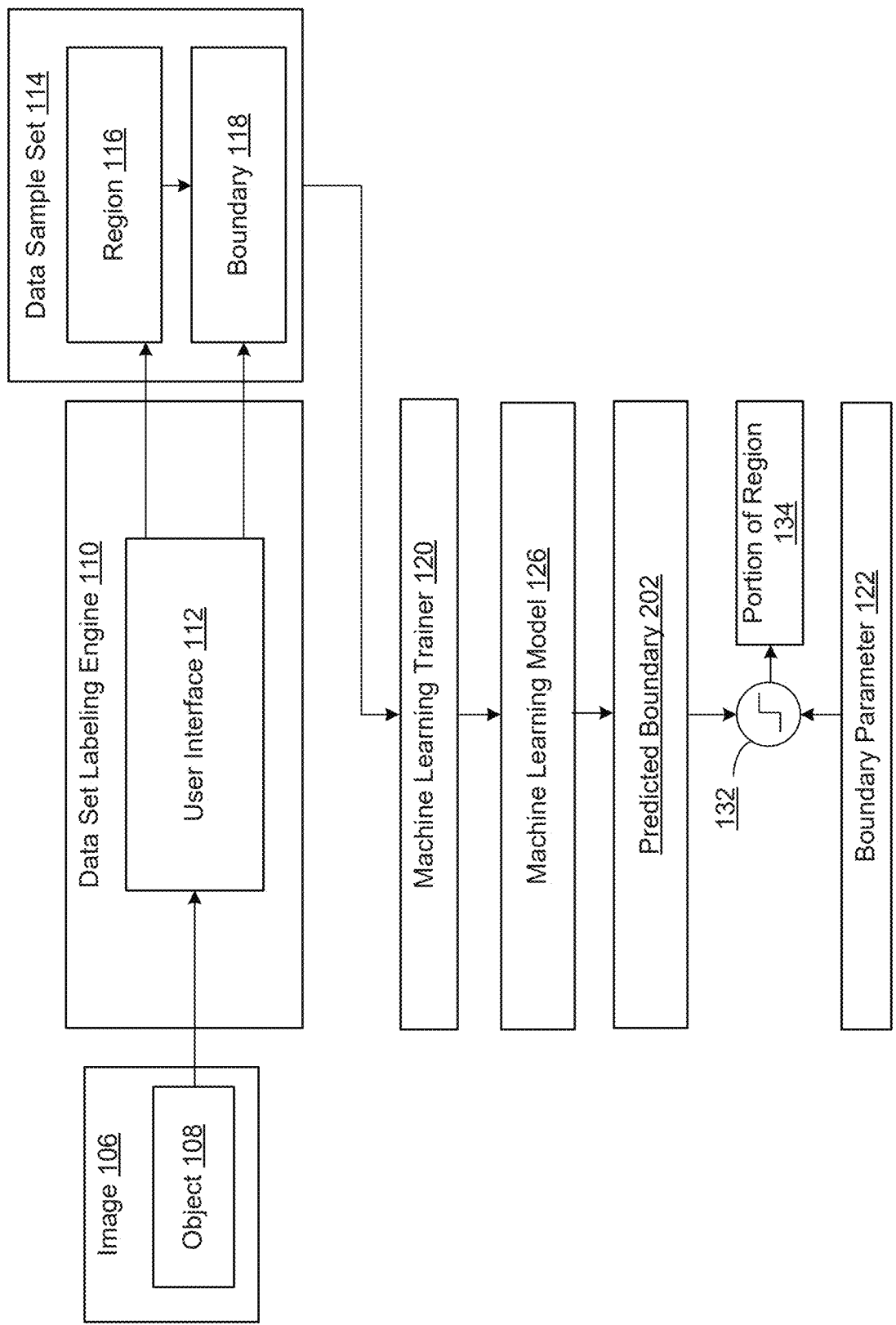
FIG. 2 is an illustration of the data set labeling engine and the machine learning trainer of FIG. 1, according to one or more embodiments.

FIG. 2 is an illustration of the data set labeling engine and the machine learning trainer of FIG. 1, according to one or more embodiments. As shown, the data set labeling engine 110 includes a user interface 112 and generates a data sample set 114. As shown, the machine learning trainer 120 uses the data sample set 114 to generate a machine learning model 126.

As shown, the data set labeling engine 110 includes a user interface 112. The user interface 112 displays the image 106 for a user and receives user input from the user. In one embodiment, the user input indicates a selection of a boundary 118 drawn by the user around the one or more objects 108. Some embodiments include semi-supervised training in which a machine learning model initially segments the image 106 into boundaries 118 around respective objects 108, and a user adjusts the boundaries 118 selected by the machine learning model for a more accurate fit around each of the objects 108.

The data set labeling engine 110 determines, for each object 108, a region 116 of the image 106 that includes the boundary 118. That is, while the boundary 118 indicates a close delineation of the object 108 from other objects and the background of the image 106, the region 116 is a more general area of the image that includes the object 108. In some embodiments, the user interface 112 receives, from a user, an indication of the region 116 as user input that indicates a rectangular crop or lasso generally encompassing the object 108 and surrounding pixels. In some embodiments, the user interface 112 receives, from a user, an indication of the region 116 as a user selection of a coordinate or pixel of the image 106 at which an object 108 is located. The data set labeling engine 110 then determines the region 116 as an outermost portion of the image where pixels of the object 108 are likely to occur. In some embodiments, the user interface 112 receives, from a process (such as another machine learning model), an indication of the region 116 as a determination of a rectangle that encloses the boundaries 118 of the object 108 drawn by a user.

In some embodiments, the data set labeling engine 110 generates the data sample set 114 by cropping each image 106 to the region 116 including each object 108. Limiting each image 106 to a particular region 116 including an object 108 can focus the training of the machine learning model 126, so that the machine learning model 126 learns to determine the particular pixels of the objects 108 and, in particular, the pixels at the boundary 118 of each object 108.

In some embodiments, the data set labeling engine 110 performs image augmentation to augment the data sample set 114. For example, for each object 108 in an image 106, the data set labeling engine 110 generates at least two different regions of the image 106, such as slightly different rectangular areas of the image 106 that include the boundary 118. That is, the machine learning trainer 120 can select different cropping areas around a particular object 108 to generate different data samples of the data sample set 114.

The machine learning model 126 determines boundaries 118 within regions 116 of images 106. The machine learning model 126 can be, for example, an artificial neural network including a series of layers of neurons. In various embodiments, the neurons of each layer are at least partly connected to, and receive input from, an input source and/or one or more neurons of a previous layer. Each neuron can multiply each input by a weight; process a sum of the weighted inputs using an activation function; and provide an output of the activation function as the output of the artificial neural network and/or as input to a next layer of the artificial neural network. In some embodiments, the machine learning model 126 includes one or more convolutional neural networks (CNNs) including a sequence of one or more convolutional layers. The first convolutional layer evaluates each image 106 using one or more convolutional filters to determine a first feature map. A second convolutional layer of the sequence receives, as input, the first feature map for each of the one or more filters and further evaluates the first feature map using one or more convolutional filters to generate a second feature map that is received as input by a third convolutional layer in the sequence, etc. The feature map produced by the last convolutional layer in the sequence can be further evaluated (e.g., by one or more fully-connected layers) to determine the boundary 118 of an object 108 within the image 106. Alternatively or additionally, in various embodiments, the machine learning model 126 can include memory structures, such as long short-term memory (LSTM) units or gated recurrent units (GRU); one or more encoder and/or decoder layers; or the like. Alternatively or additionally, the machine learning model 126 can include one or more other types of models, such as, without limitation, a Bayesian classifier, a Gaussian mixture model, a k-nearest-neighbor model, a decision tree or a set of decision trees such as a random forest, a restricted Boltzmann machine, or the like, or an ensemble of two or more machine learning models of the same or different types. In some embodiments, the image segmentation engine 124 includes two or more machine learning models 126 that are used together as an ensemble. The two or more machine learning models 126 can be a same or similar type (e.g., two or more convolutional neural networks) or of different types (e.g., a convolutional neural network and a Gaussian mixture model classifier).

In some embodiments, the machine learning model 126 outputs the boundary 118 for each region 116 as a determination of the pixels of the image 106 that are included in an object 108. For example, the machine learning model 126 can output a per-pixel classification, such as a per-pixel score indicating the likelihood that the pixel belongs within the boundary 118 of the object 108. Alternatively or additionally, in some embodiments, the machine learning model 126 outputs the boundary 118 for each region 116 as a set of properties of pixels that are within the boundary 118, such as one or more color ranges of pixel colors. Alternatively or additionally, in some embodiments, the machine learning model 126 outputs the boundary 118 for each region 116 as a set of coordinates that define vertices of the boundary 118 within the region 116. For example, the machine learning model 126 can output the coordinates of line segments within the region 116 that define the contours of the boundary 118, and/or the coordinates of a set of polygons for which the union defines the contours of the boundary 118.

The machine learning trainer 120 trains the machine learning model 126 to determine the boundaries 118 of one or more objects 108 in each region 116. In some embodiments, the machine learning trainer 120 compares the boundary 118 associated with each region 116 in the data sample set 114 with a boundary 118 determined by the machine learning model 126 for each region 116 of the data sample set 114. If the associated boundary 118 and the predicted boundary 118 do not match, then the machine learning trainer 120 adjusts the parameters of the machine learning model 126 to reduce the difference. The machine learning trainer 120 can repeat this parameter adjustment process over the course of training until the output of the machine learning model 126 is sufficiently close to or matches with the boundaries 118 associated with the objects 108 of the respective images 106. In some embodiments that involve data augmentation, the machine learning trainer 120 includes, in a training batch of the training at least two different regions 116 for at least one object 108 of at least one image 106. In some embodiments, during training, the machine learning trainer 120 monitors a performance metric, such as a loss function, that indicates the correspondence between the associated boundaries 118 and the predicted boundaries 118 for each of the images 106 of the data sample set 114. The machine learning trainer 120 trains the machine learning model 126 through one or more epochs until the performance metric indicates that the correspondence of the associated boundaries 118 and the predicted boundaries 118 is within an acceptable range of accuracy.

The image segmentation further determines a portion 134 of the region 116 that includes the object 108 based on the boundary 118 and a boundary parameter 122. As an example, the boundary parameter 122 can be a score threshold that indicates whether each pixel of the region 116 is included in the object 108. That is, the machine learning model 126 determines a per-pixel score for each pixel of the region 116, wherein the score indicates a likelihood that the pixel is included in the object 108. An operation 132 combines a predicted boundary 118 determined by the machine learning model 126 and a boundary parameter 122 to determine the portion 134 of the region 116 that includes the object 108. A larger value of the boundary parameter 122 (e.g., a higher score threshold) results in a more conservative determination of the portion 134 of the region 116. A smaller value of the boundary parameter 122 (e.g., a lower score threshold) results in a more expansive determination of the portion 134 of the region 116. In some embodiments, a portion of the machine learning model 126 applies the boundary parameter 122 to the per-pixel scores, such as a last layer or output filter of the machine learning model 126. In some other embodiments, an image segmentation engine 124 processes an output of the machine learning model 126, such as per-pixel scores, with the boundary parameter 122, such as a per-pixel score threshold.

In some embodiments, the data sample set 114 further includes, for each object 108, a label that indicates an object type of the object 108, such as a car, a bicycle, or a pedestrian. For example, the user interface 112 can receive from a user, such as a human labeler, a selection of a label that indicates the object type of the object 108. Alternatively or additionally, in some embodiments, another machine learning model, such as a convolutional neural network (CNN), classifies each region 116 as including an object 108 of a particular object type. In some embodiments, the machine learning model 126 determines the boundary 118 of each object 108 within an image 106 irrespective of an object type of the object 108. Alternatively, in some embodiments, the machine learning trainer 120 trains one machine learning model 126 to determine boundaries 118 for objects 108 of one or more particular object types. For example, the machine learning trainer 120 can train a first machine learning model 126 to determine boundaries 118 for cars, and a second machine learning model 126 can be trained to determine boundaries 118 for pedestrians.

Figure 3:
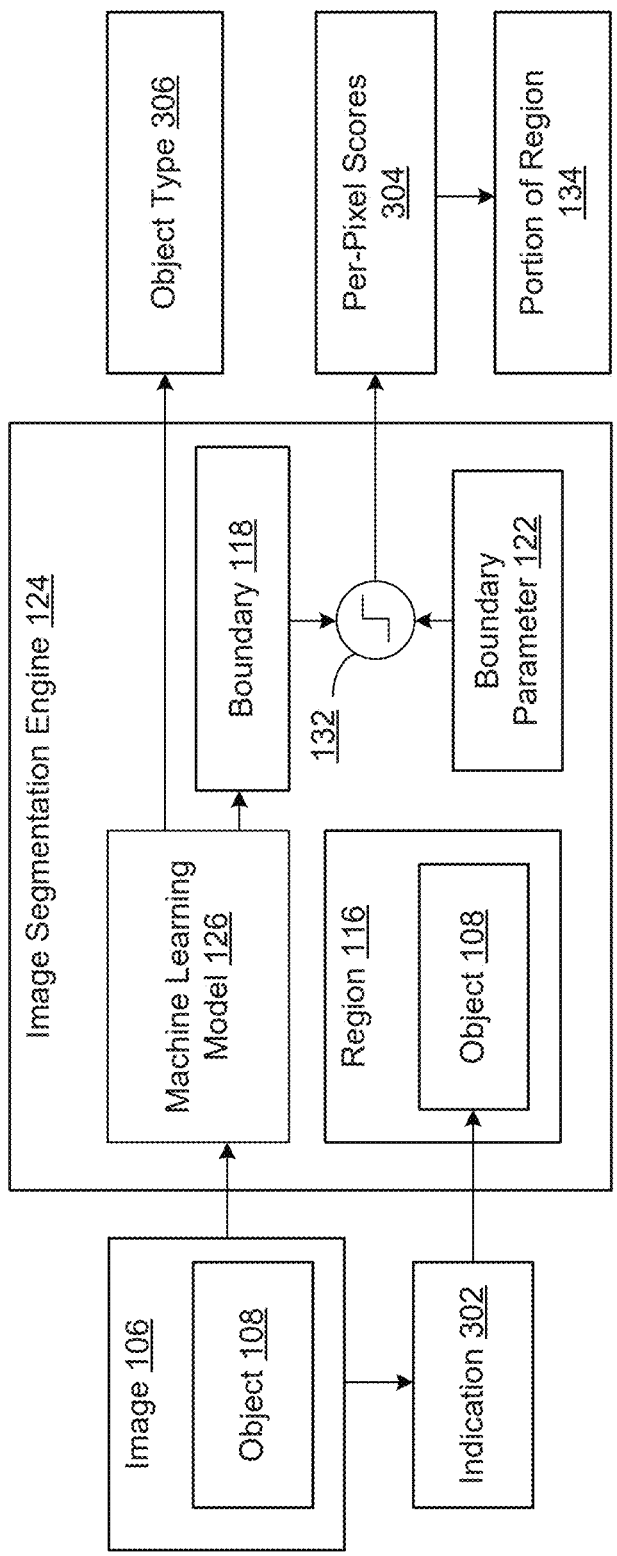
FIG. 3 is an illustration of the image segmentation engine of FIG. 1, according to one or more embodiments.

FIG. 3 is an illustration of the image segmentation engine of FIG. 1, according to one or more embodiments. As shown, the image segmentation engine 124 determines a portion 134 of a region 116 of an image 106 including an object 108 based on a boundary parameter 122.

As shown, an image 106 includes one or more objects 108. The image segmentation engine 124 receives an indication 302 of a region 116 including the object 108. For example, the image segmentation engine 124 can receive the indication 302 as user input indicating a rectangular selection of an area of the image 106 including the object 108, or an automated segmentation of the image 106 into regions 116 that respectively encompass one or more objects 108. In some embodiments, another machine learning model performs a first segmentation process to generate the indication 302 of the region 116, such as a computer vision model that determines an approximate or general region 116 in which an object 108 appears. In some embodiments, a non-visual system generates the indication 220 of the region 116, such as a LIDAR detector that determines a physical object within a physical area, and the region 116 of the image 106 corresponds to the location of the detected object within the physical area. As compared with whole-image segmentation, limiting the image segmentation process of FIG. 3 to a region 116 in which an object 108 is initially determined to appear can improve the speed and/or confidence of the determination of boundaries 118 by the machine learning model 126.

The image segmentation engine 124 processes each region 116 using a machine learning model 126 to determine a boundary 118 and determines a portion 134 of the region 16 that includes the object 108 based on a boundary parameter 122. In some embodiments, the image segmentation engine 124 receives the boundary parameter 122 as input along with the region 116 of the image 106. In some embodiments, the image segmentation engine 124 receives the boundary parameter 122 as user input. Based on the boundary 118, the image segmentation engine 124 determines the portion 134 of the region 116 that includes the object 108 (e.g., the subset of pixels of the region 116 that are included in the object 108) based on the boundary parameter 122. Specifically, the image segmentation engine 124 can apply an operation 132 to combine the boundary 118 determined by the machine learning model 126 and the boundary parameter 122. In some embodiments, the machine learning model 126 can determine and output a set of per-pixel score 304 for respective pixels of the region 116 of the image 106, wherein each per-pixel score 304 indicates a likelihood that the pixel is included in the object 108. The per-pixel scores 304 indicate the boundary 118 of the object 108, for example, an outermost geometric area of the region 116 that includes high-confidence pixels and excludes low-confidence pixels. The image segmentation engine 124 can apply the operation 132 to determine the portion 134 of the region 116 including the object 108 based on the boundary parameter 122, for example, the subset of pixels within the boundary 118 that have per-pixel scores 304 above a score threshold. Alternatively or additionally, in some embodiments (not shown), the machine learning model 126 outputs one or more coordinates that indicate vertices of the boundary 118, and the image segmentation engine 124 determines the portion 134 of the image 106 depicting the object 108 as the subset of pixels within the coordinates defining the boundary 118. In some cases, the subset of pixels is a solid group, while in other cases, the subset of pixels could include one or more subgroups of excluded pixels.

In some embodiments, the image segmentation engine 124 additionally determines other properties of the image 106. As shown, the image segmentation engine 124 determines an object type 306 of the object 108 within the portion 134 of the region 116, such as a car, a bicycle, or a pedestrian. In some embodiments, the image segmentation engine 124 determines a score for each object type of an object type set, wherein each score for each object type indicates a likelihood that the portion of the region includes an object of the object type. For example, the image segmentation engine 124 can determine the object type 306 using the same machine learning model 126 that determines the boundary 118 or using a different component, such as another machine learning model. In some embodiments, the determination of the boundary 118 of the object 108 by the machine learning model 126 occurs independently of, and is irrespective of, the determined object type 306. In some other embodiments, the machine learning model determines the boundary 118 of the object 108 based on the object type 306. For example, the image segmentation engine 124 can initially determine an object type 306 of the object 108 within the region 116, and can select, from a set of machine learning models, a particular machine learning model 126 that has been trained to determine boundaries 118 for objects 108 of the determined object type 306. That is, each object type is associated with a type-specific machine learning model that is trained to determine boundaries of objects 108 of the object type, and the image segmentation engine 124 can determine the boundary using the type-specific machine learning model that generates a highest score. In some embodiments, the image segmentation engine 124 selects a boundary parameter 122 based on a determined object type 306 and uses the selected boundary parameter 122 to determine the portion 134 of the region 116 that includes the object 108.

Figure 4A:
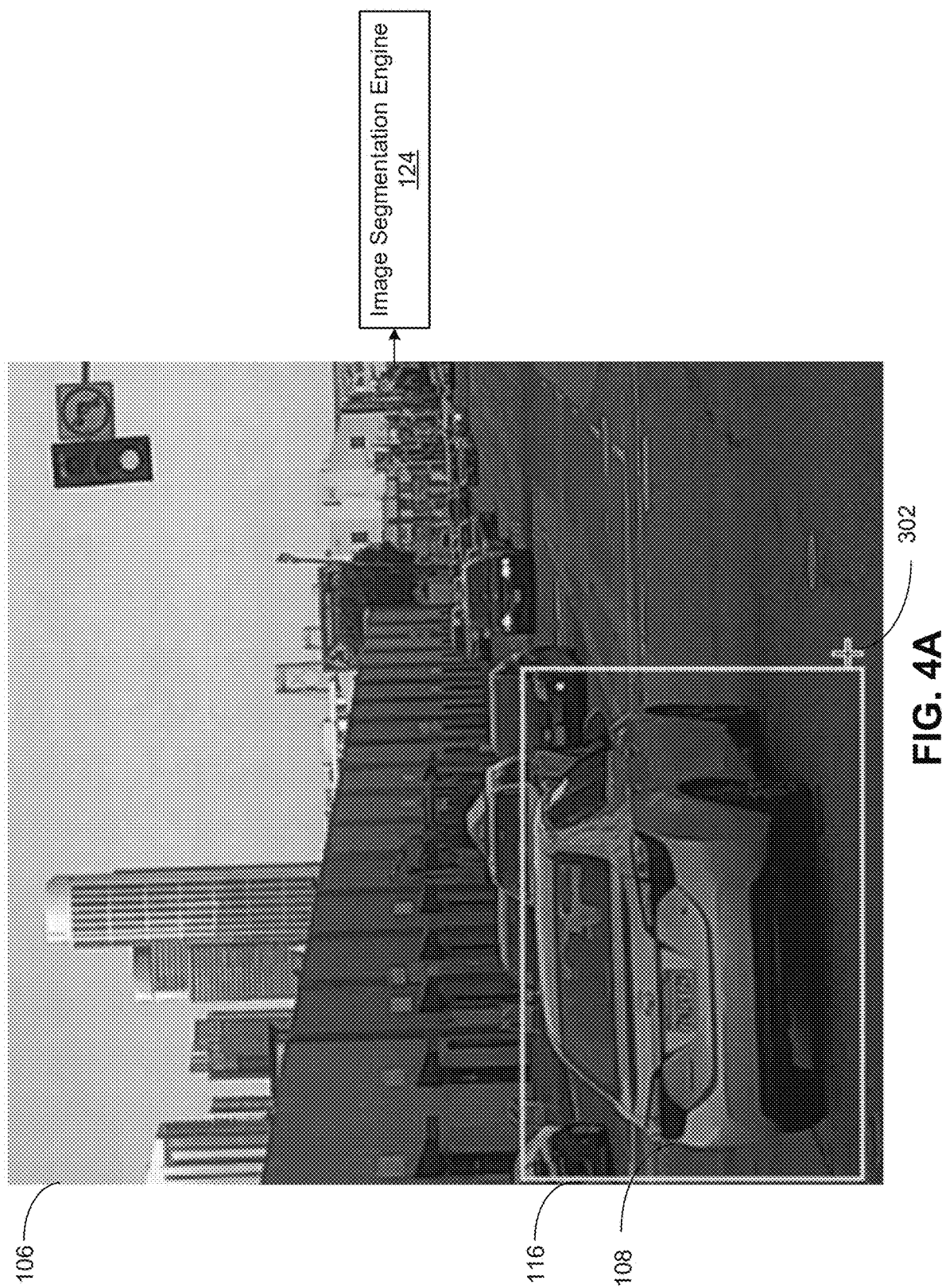
FIGS. 4A-4B are an illustration of a first image segmentation, according to one or more embodiments.
Figure 4B:
Figure 4B:
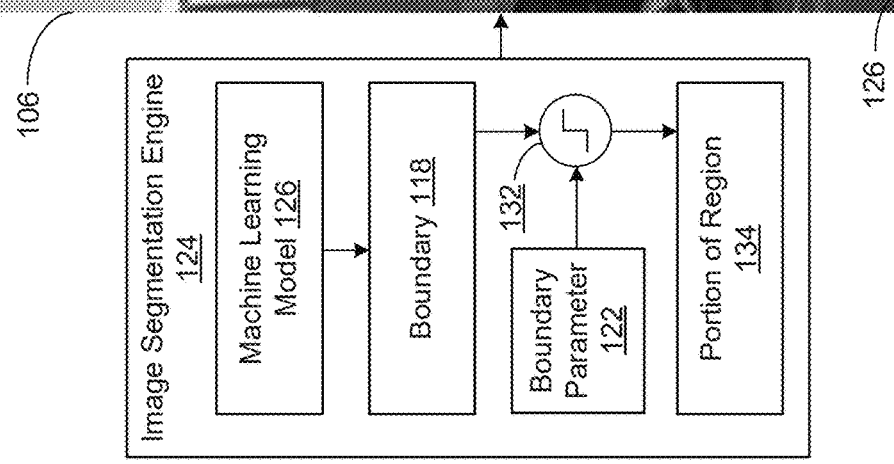

FIGS. 4A-4B are an illustration of a first image segmentation, according to one or more embodiments. As shown, in FIG. 4A, an image segmentation engine 124 receives an image 106 and an indication 302 of a region 116 of the image 106 that includes an object 108, such as a vehicle. The image segmentation engine 124 can receive the indication 302, for example, as a selection of the region 116 by a user, or as a general or approximate segmentation of the image 106 by another component, such as another machine learning model. In some embodiments, the image segmentation engine 124 crops the image 106 to the region 116 for processing by the machine learning model 126. In some embodiments, the image segmentation engine 124 also classifies the region 116, such as an object type selected from an object type set.

As shown, in FIG. 4B, the image segmentation engine 124 processes the region of the image 106 with the machine learning model 126 to determine a boundary 118 of the object 108. In various embodiments, the machine learning model boundary 118 can output the boundary 118 as a set of per-pixel scores 304, as coordinates of vertices of line segments or polygons of the boundary 118, or the like. The image segmentation engine 124 can apply an operation 132 to the boundary 118 and a received boundary parameter 122 to determine the portion 134 of the region that includes the object 108. As shown, the operation 132 is a per-pixel determination of the pixels of the vehicle within the image 106, and the boundary parameter 122 is a per-pixel threshold that the operation 132 uses to determine the pixels of the region 116 that are included in the object 108.

Figure 5A:
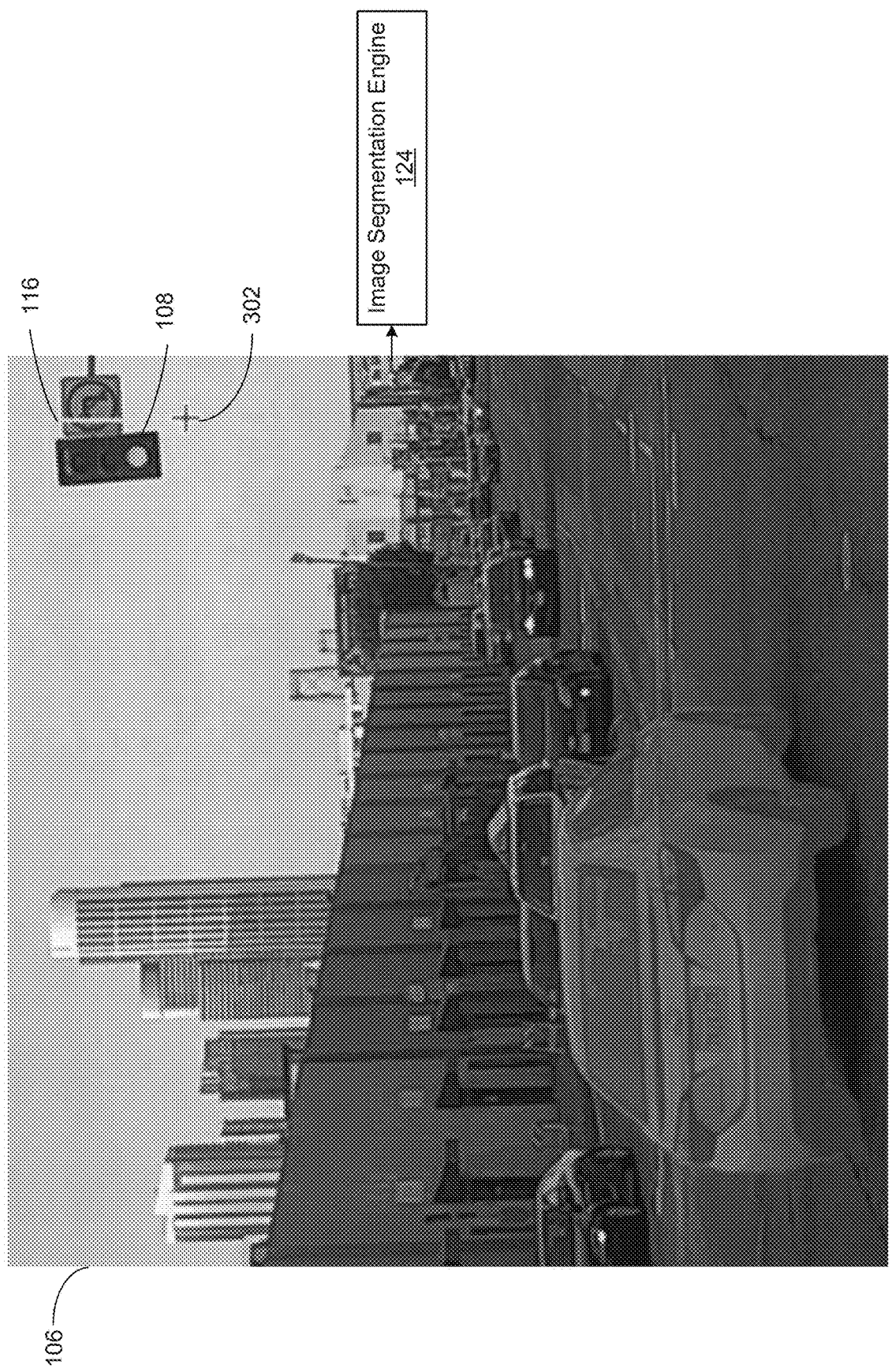
FIGS. 5A-5B are an illustration of a second image segmentation, according to one or more embodiments.
Figure 5B:

FIGS. 5A-5B are an illustration of a second image segmentation, according to one or more embodiments. As shown in FIG. 5A, an image segmentation engine 124 receives an image 106 and an indication 302 of a region 116 of the image 106 that includes an object 108, such as a traffic signal. The image segmentation engine 124 can receive the indication 302, for example, as a selection of the region 116 by a user, or as a general or approximate segmentation of the image 106 by another component, such as another machine learning model. In some embodiments, the image segmentation engine 124 crops the image 106 to the region 116 for processing by the machine learning model 126. In some embodiments, the image segmentation engine 124 also classifies the region 116, such as an object type selected from an object type set.

As shown in FIG. 5B, the image segmentation engine 124 processes the region of the image 106 with the machine learning model 126 to determine a boundary 118 of the object 108 and determines a portion 134 of the region 116 that includes the object 108 based on a received boundary parameter 122. In some embodiments, the boundary parameter 122 is based on the object type of the classification of the region 116. For example, the image segmentation engine 124 can include a set of machine learning models for various object types. Alternatively, the image segmentation engine 124 can select a boundary parameter 122, wherein the selection is based on the object type of the determined for the region 116. In various embodiments, the machine learning model boundary 118 can output the boundary 118 as a set of per-pixel scores 304, as coordinates of vertices of line segments or polygons of the boundary 118, or the like. The image segmentation engine 124 applies the operation 132 to the boundary 118 and the boundary parameter 122 determine the portion 134 of the region that includes the object 108. As shown, the determined portion 134 of the region of the image 106 is based on an operation 132 including a per-pixel determination of the pixels of the traffic signal within the image 106.

Figure 6A:
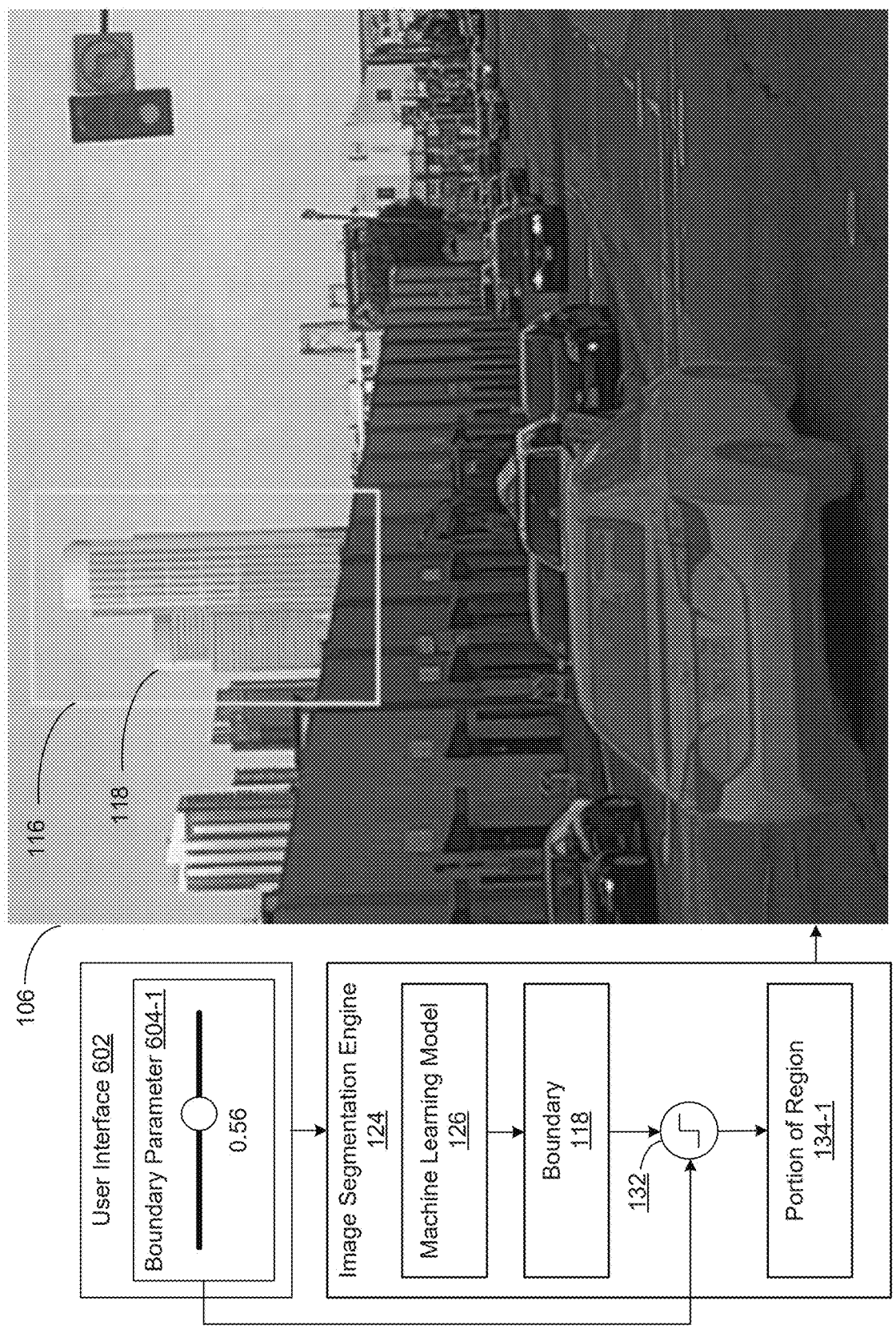
FIGS. 6A-6B are an illustration of a third image segmentation, according to one or more embodiments.
Figure 6B:
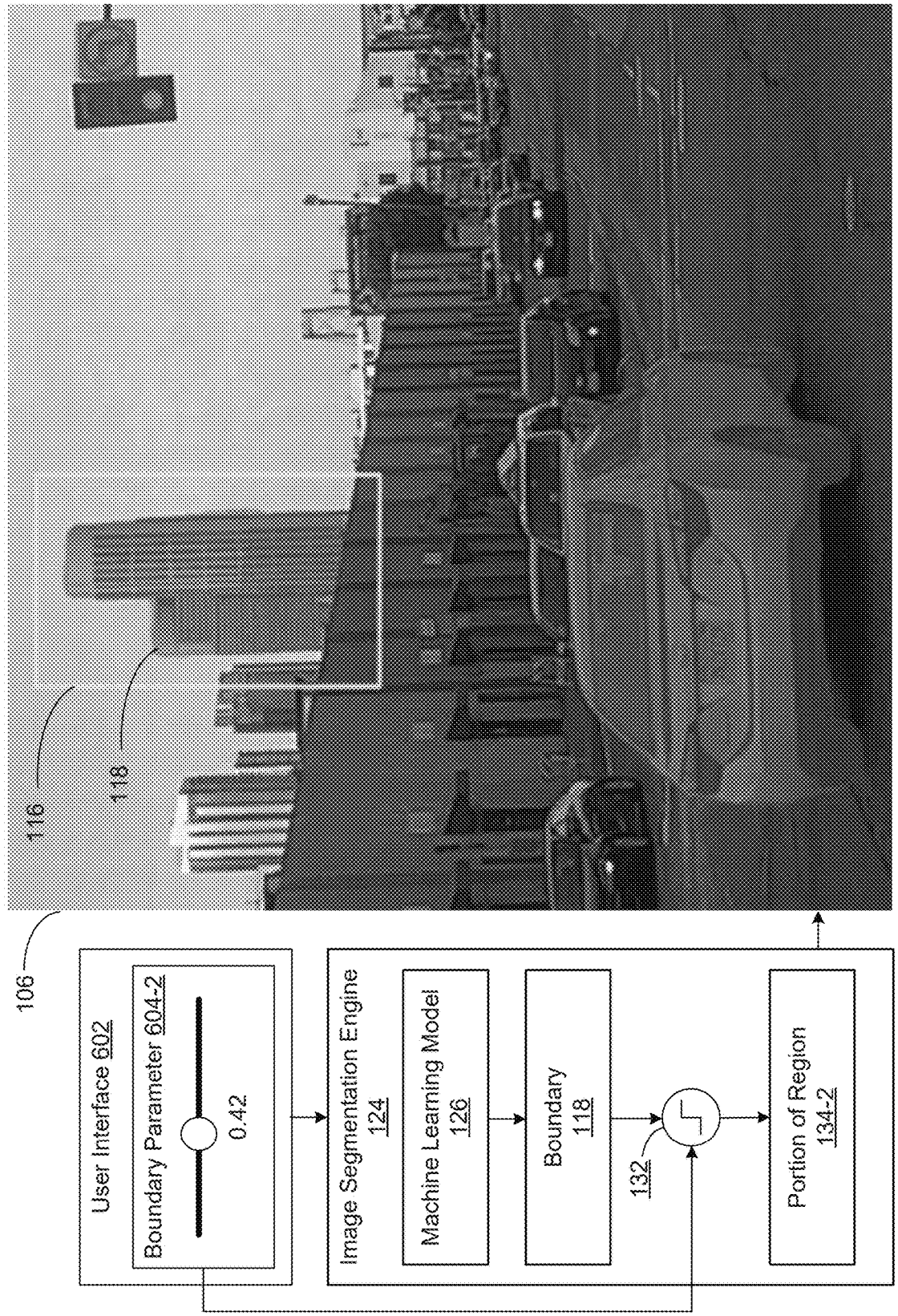

FIGS. 6A-6B are an illustration of a third image segmentation, according to one or more embodiments. As shown in FIG. 6A, an image segmentation engine 124 receives, for an image 106, an indication of a region 116 that includes an object 108 such as a building. The image segmentation engine 124 receives, from a user interface 602 including a user control, a user selection of a first boundary parameter 604-1. The first boundary parameter 604-1 can be, for example, a per-pixel score threshold and/or a color contrast threshold. In some embodiments, the image segmentation engine 124 processes the image 106 with a machine learning model that has been trained to determine a boundary of an object 108 within the region 116. The image segmentation engine 124 processes the region using the machine learning model 126 to determine a boundary 118 of the object 108 within the region. Based on the boundary 118 and the first boundary parameter 604-1, the image segmentation engine 124 applies an operation 132 to determine a first portion 134-1 of the region that includes the object 108, such as a subset of pixels having per-pixel scores that are above a score threshold. The image segmentation engine 124 can display the image 106 to the user, including displaying the portion 134 of the region 116 that includes each object 108 based on the first boundary parameter 604-1 received from the user.

As shown in FIG. 6B, an image segmentation engine 124 performs a second segmentation of the same region of the image 106 based on a second boundary parameter 604-2. As shown, the image segmentation engine 124 receives the second boundary parameter 604, for example, as another user selection through the user interface 602. As shown, the user selection of the second boundary parameter 604-2 is different than the user selection of the first boundary parameter 604-1. The second boundary parameter 604-2 can be, for example, a per-pixel score threshold and/or a color contrast threshold. The second boundary parameter 604-2 causes the image segmentation engine 124 to determine the region 116 more expansively than the first boundary parameter 604-1. In some embodiments, based on the boundary 118 and the second boundary parameter 604-2, the image segmentation engine 124 applies the operation 132 to determine a second portion 134-2 of the region that includes the object 108 as a different subset of pixels having per-pixel scores that are above a score threshold. The image segmentation engine 124 can display the image 106 to the user, including displaying the portion 134 of the region 116 that includes each object 108 based on the second boundary parameter 604-2 received from the user. As shown in FIGS. 5A-5B, the user interface 602 enables a user to select different boundary parameters 604 and to view different resulting determined portions 134 of the region based on each selected boundary parameter 604.

Figure 7:
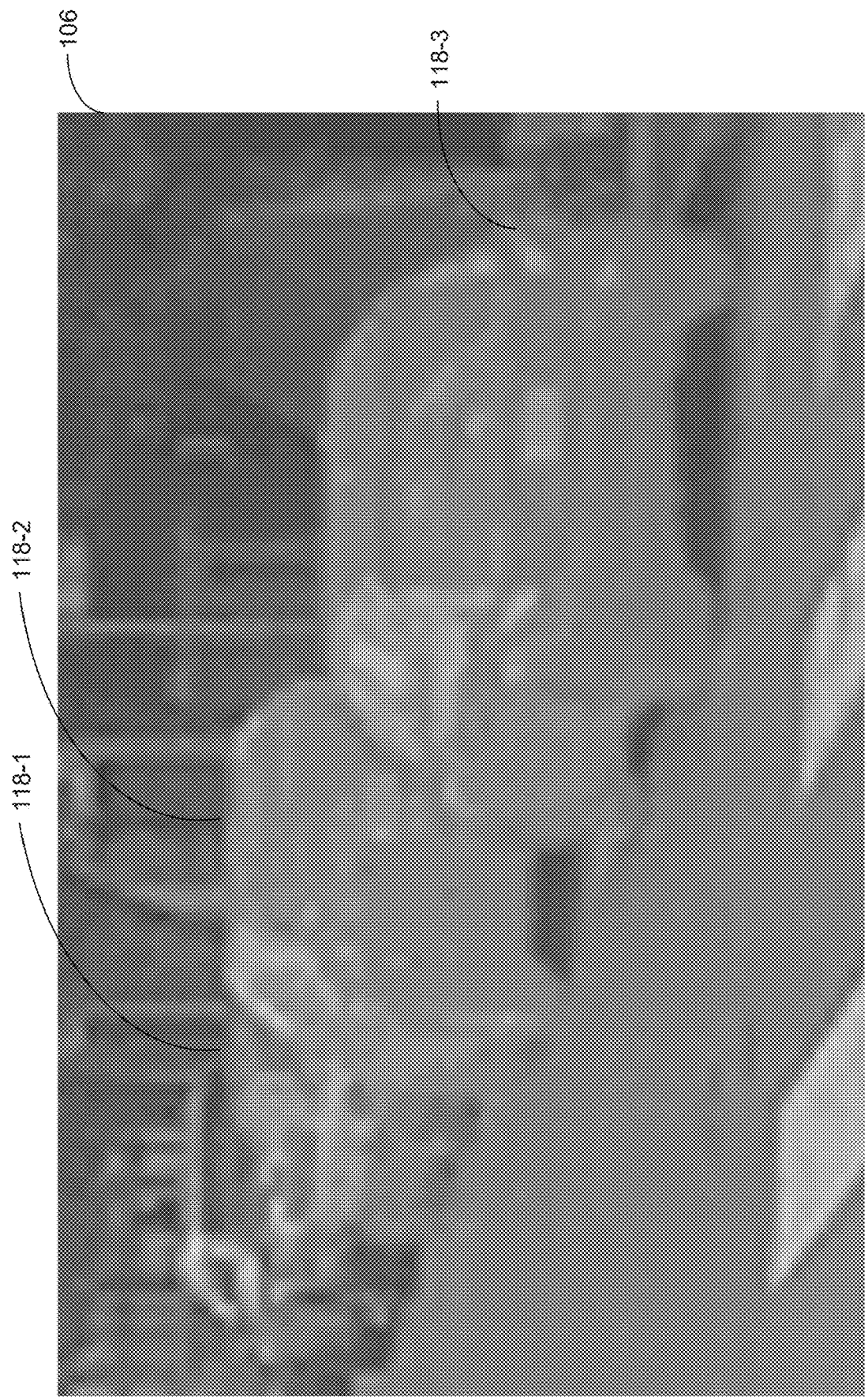
FIG. 7 is an illustration of a fourth image segmentation, according to one or more embodiments.

FIG. 7 is an illustration of a fourth image segmentation, according to one or more embodiments. As shown, an image 106 includes three objects, such as three vehicles. Further, the regions of the image 106 that include the respective objects overlap, such that a first region of the image 106 including a first object overlaps a second region of the image 106 including a second object, and the second region of the image 106 including the second object also overlaps a third region of the image 106 including a third object. Based on the techniques disclosed herein, an image segmentation engine processes each region based on a received boundary parameter and determines a boundary of each of the objects. Further, the image segmentation engine determines a boundary 118 and a first portion 134-1 of the image 106 that includes the first object (e.g., the subset of pixels including the first vehicle). The image segmentation engine determines the boundary 118 and a second portion 134-2 of the image 106 that includes the second object (e.g., the subset of pixels including the second vehicle). The image segmentation engine determines a third boundary 118-3 and a third portion 134-3 of the image 106 that includes the third object (e.g., the subset of pixels including the third vehicle). The per-pixel determination based on the received boundary parameter enables the determination of the respective portions 134-1, 134-2, 134-3 of the image 106 that include each of the objects. That is, the use of the boundary parameter enables boundary determinations with high per-pixel accuracy, as shown in FIG. 7.

In some embodiments, the image segmentation engine 124 can classify each pixel of an image 106 as being included in either an object 108 of the image 106 or a background of the image 106. For example, for an image 106 including at least two objects 108 and a pixel between the two objects 108, the image segmentation engine 124 can determine that the portion 134 of the region 116 for one object 108 of the of the at least two objects 108 includes the pixel. For example, as shown in FIG. 7, some pixels are on the border between overlapping objects. The image segmentation engine 124 can determine that each pixel between the two objects 108 is included in one or the other of the two objects 108, for example, based on the per-pixel scores determined by the machine learning model 126 for each object 108.

Figure 8:
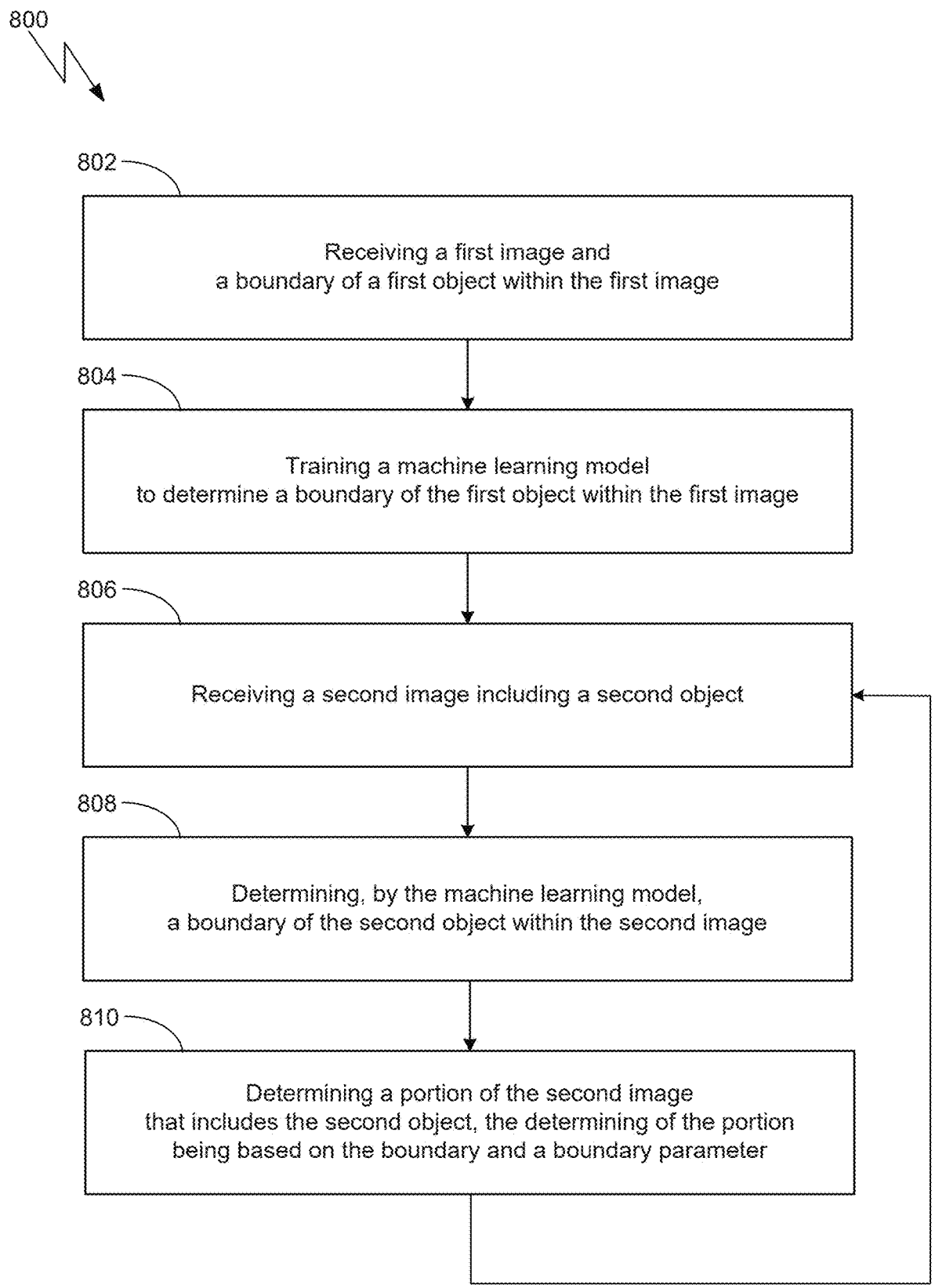
FIG. 8 is a flow diagram of method steps for performing image segmentation using a machine learning model, according to one or more embodiments.

FIG. 8 is a flow diagram of method steps for performing image segmentation by a machine learning model, according to one or more embodiments. The method steps could be performed, for example, by the server 101 of FIGS. 1, 2, and/or 3. Although the method steps are described with reference to FIGS. 1, 2, and 3, persons skilled in the art will understand that any system may be configured to implement the method steps, in any order, in other embodiments.

As shown, at step 802, a data set labeling engine receives a first image and a boundary of a first object within the first image. For example, as shown in FIG. 1, the data sample set 114 includes at least one image 106 and a boundary 118 of an object within the first image 106.

At step 804, a machine learning trainer trains a machine learning model to determine a boundary of the first object within the first image. For example, as shown in FIG. 1, the machine learning trainer 120 trains the machine learning model 126 to determine the boundaries 118 of the objects 108 within the regions 116 of the images 106 of the data sample set 114.

At step 806, an image segmentation engine receives a second image including a second object. For example, as shown in FIG. 3, the image segmentation engine 124 receives an image 106 including an object 108, and for which the boundary 118 of the object 108 is not yet known. In some embodiments, the image segmentation engine 124 can crop the image 106, such as an initial approximation of the region 116 of the image 106 that includes the object 108.

At step 808, the image segmentation engine determines, by the machine learning model, a boundary of the second object within the second image. For example, as shown in FIG. 3, the image segmentation engine 124 processes the received image 106 with the machine learning model 126 to determine the boundary 118 of the object 108 within the image 106. The image segmentation engine 124 can further determine the portion 134 of the region 116 of the image 106 within the boundary 118, such as the subset of pixels of the image 106 that include the object 108.

At step 810, the image segmentation engine determines a portion of the second image that includes the second object, wherein the determining of the portion is based on the boundary 118 and a boundary parameter 122. For example, the boundary parameter 122 can be received from a user. The embodiment can return to step 806 to receive additional images and to determine additional portions of images that include objects based on the boundary 118 determined by the machine learning model and the boundary parameter 122.

Figure 9:
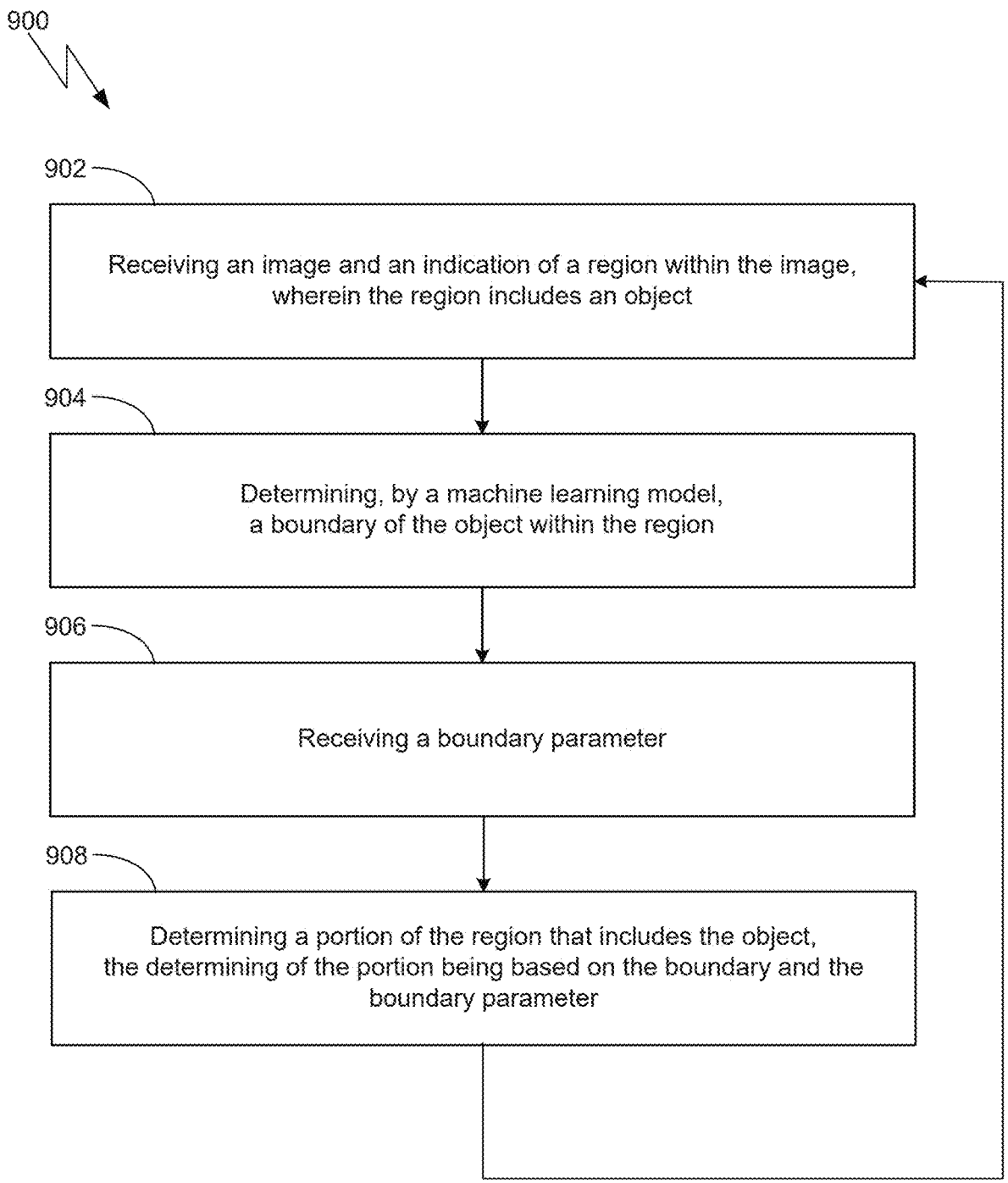
FIG. 9 is a flow diagram of method steps for segmenting an image using a machine learning model, according to one or more embodiments.

FIG. 9 is a flow diagram of method steps for segmenting an image using a machine learning model, according to one or more embodiments. The method steps could be performed, for example, by the server 101 of FIGS. 1 and/or 3. Although the method steps are described with reference to FIGS. 1 and 3, persons skilled in the art will understand that any system may be configured to implement the method steps, in any order, in other embodiments.

As shown, at step 902, an image segmentation engine receives an image and an indication of a region within the image, wherein the region includes an object. For example, as shown in FIG. 3, the image segmentation engine 124 receives an image 106 and an indication 302 of a region 116 of the image 106 that includes an object 108. The indication 302 can be, for example, an initial approximation of the area of the image 106 that includes the object 108.

At step 904, an image segmentation engine determines, by a machine learning model, a boundary of the object within the image. For example, as shown in FIG. 1, the image segmentation engine 124 can perform image segmentation 128 by processing a received image 106 with a machine learning model 126 that has been trained to determine boundaries 118.

At step 906, the image segmentation engine receives a boundary parameter. In some embodiments, and as shown in FIGS. 6A and 6B, the image segmentation engine receives a boundary parameter 604-1, 604-2 from a user through a user interface 602. In some embodiments, the image segmentation engine receives the boundary parameter from another component, such as another machine learning model configured to select the boundary parameter.

At step 908, an image segmentation engine determines a portion of the region that includes the object, the determining of the portion being based on the boundary and the boundary parameter. For example, as shown in FIG. 1, the image segmentation engine 124 compares a set of per-pixel scores with a score threshold to determine the portion 134 of the region 116 of the received image 106 that includes the object 108. The embodiment can return to step 902 to determine the boundaries of objects of additional received images.

In sum, techniques are disclosed for image segmentation with boundary refinement. An image segmentation engine receives an image and an indication of a region within the image, wherein the region includes an object. The indication can be an initial boundary of the object within the image, or a selection of a coordinate within the image where the object appears. The indication can be received through a user interface or can be determined by another machine learning model. The image segmentation engine determines, by a machine learning model, a portion of the region that includes the object, wherein the determining is based on a boundary determined according to a received boundary parameter. Determining the portion of the image based on the received boundary parameter improves the ability of the image segmentation engine to determine the portion of the image that includes the object.

At least one technical advantage of the disclosed techniques is the determination of boundaries of objects with greater accuracy (e.g., greater per-pixel accuracy). The use of a received boundary parameter enables determinations of the portion of an image that includes the object that are more specific to the visual features of the object. Further, boundary determinations are less susceptible to errors due to visual artifacts, limitations of the camera, and/or partial occlusion. Finally, the use of a received boundary parameter to determine the portion of the image provides an additional feature for enabling a user to label images that can be used for training or retraining the machine learning model to meet various performance indicators, such as precision or recall. These technical advantages provide one or more technological improvements over prior art approaches.

1. In some embodiments, a computer-implemented method comprises receiving an image and an indication of a region within the image, wherein the region includes an object; determining, by a machine learning model, a boundary of the object within the region; receiving a boundary parameter; and determining a portion of the region that includes the object, the determining of the portion of the region being based on the boundary and the boundary parameter.

2. The computer-implemented method of clause 1, wherein the indication is received from a user through a user interface.

3. The computer-implemented method of clauses 1 or 2, wherein the indication is determined by a machine learning model.

4. The computer-implemented method of any of clauses 1-3, wherein the boundary parameter is a hyperparameter of the machine learning model.

5. The computer-implemented method of any of clauses 1-4, further comprising generating a score that indicates a likelihood that the portion includes the object.

6. The computer-implemented method of any of clauses 1-5, further comprising generating a per-pixel score for each pixel of the region, wherein each per-pixel score indicates a likelihood that the pixel is included in the object.

7. The computer-implemented method of any of clauses 1-6, wherein the boundary parameter includes a score threshold applied to the per-pixel scores to determine the pixels that are included in the portion of the region.

8. The computer-implemented method of any of clauses 1-7, wherein a portion of the machine learning model applies the boundary parameter to the per-pixel scores.

9. The computer-implemented method of any of clauses 1-8, further comprising determining a score for each object type of an object type set, wherein each score for each object type indicates a likelihood that the portion of the region includes an object of the object type.

10. The computer-implemented method of any of clauses 1-9, wherein each object type is associated with a type-specific machine learning model that is trained to determine boundaries of objects of the object type, and the boundary is determined by the type-specific machine learning model that generates a highest score.

11. The computer-implemented method of any of clauses 1-10, wherein the image includes at least two objects and a pixel between the two objects, and the portion of the region for one object of the at least two objects is determined to include the pixel.

12. The computer-implemented method of any of clauses 1-11, wherein the boundary parameter is received from a user, and the computer-implemented method further comprises displaying, to the user, the portion of the region that includes the object based on the boundary parameter received from the user.

13. In some embodiments, a computer-implemented method comprises receiving an image and a boundary of an object in the image; and training a machine learning model to determine the boundary within the image, the determining being based on a received boundary parameter.

14. The computer-implemented method of clause 13, wherein the machine learning model is trained based on a cropped image in which the image is cropped to a region of the image, wherein the region includes the object.

15. The computer-implemented method of clauses 13 or 14, wherein at least two cropped images are cropped to different regions of the image, wherein each of the different regions includes the object.

16. The computer-implemented method of any of clauses 13-15, wherein the machine learning model is trained using the at least two cropped images of the object as a training batch.

17. In some embodiments, a system comprises a memory that stores instructions, and a processor that is coupled to the memory and, when executing the instructions, is configured to receive an image and an indication of a region within the image, wherein the region includes an object; determine, by a machine learning model, a boundary of the object within the region; receive a boundary parameter; and determine a portion of the region that includes the object, the determining of the portion of the region being based on the boundary and the boundary parameter.

18. The system of clause 17, wherein the machine learning model generates a per-pixel score for each pixel of the region, each per-pixel score indicating a likelihood that the pixel is included in the object, and the boundary parameter includes a score threshold applied to the per-pixel scores to determine the pixels that are included in the portion of the region.

19. In some embodiments, one or more non-transitory computer-readable media stores instructions that, when executed by one or more processors, cause the one or more processors to perform the steps of receiving an image and an indication of a region within the image, wherein the region includes an object; receiving a boundary parameter; and determining, by a machine learning model, a portion of the region that includes the object, wherein the determining is based on a boundary and the boundary parameter.

20. The one or more non-transitory computer-readable media of clause 19, wherein the machine learning model generates a per-pixel score for each pixel of the region, each per-pixel score indicating a likelihood that the pixel is included in the object, and the boundary parameter includes a score threshold applied to the per-pixel scores to determine the pixels that are included in the portion of the region.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
receiving an image and an indication of a region within the image, wherein the region identifies an outermost portion of the image where pixels of an object are likely to occur, wherein the indication comprises a bounding box drawn by a user via a graphical user interface;
determining, by a machine learning model, a per-pixel score for each pixel within the region, wherein, for each pixel, the per-pixel score indicates a likelihood that the pixel is included in the object;
determining a boundary of the object within the region based on the per-pixel scores for pixels within the region;
receiving a boundary parameter that indicates a score threshold to be applied to per-pixel scores of the pixels of the region;
determining a portion of the region that includes the object by applying the score threshold to the per-pixel scores of the pixels, wherein only pixels having per-pixel scores which exceed the score threshold are included in the portion;
receiving a second boundary parameter that indicates a second score threshold to be applied to per-pixel scores of the pixels of the region, wherein the second score threshold is different from the score threshold;
determining a second portion of the region that includes the object by applying the second score threshold to the per-pixel scores of the pixels, wherein only pixels having per-pixels scores which exceed the second score threshold are included in the second portion; and
via the graphical user interface, displaying the portion upon selection of the boundary parameter by the user and displaying the second portion upon selection of the second boundary parameter by the user.

2. The computer-implemented method of claim 1, wherein the indication is determined by a second machine learning model.

3. The computer-implemented method of claim 1, wherein the boundary parameter is a hyperparameter of the machine learning model.

4. The computer-implemented method of claim 1, wherein a portion of the machine learning model applies the boundary parameter to the per-pixel scores.

5. The computer-implemented method of claim 1, further comprising determining a score for each object type of an object type set, wherein each score for each object type indicates a likelihood that the portion of the region includes an object of the object type.

6. The computer-implemented method of claim 5, wherein each object type is associated with a type-specific machine learning model that is trained to determine boundaries of objects of the object type, and the boundary is determined by the type-specific machine learning model that generates a highest score.

7. The computer-implemented method of claim 1, wherein the image includes at least two objects and a pixel between the two objects, and the portion of the region for one object of the at least two objects is determined to include the pixel.

8. A system, comprising:
a memory that stores instructions, and
a processor that is coupled to the memory and, when executing the instructions, is configured to:
receive an image and an indication of a region within the image, wherein the region identifies an outermost portion of the image where pixels of an object are likely to occur, wherein the indication comprises a bounding box drawn by a user via a graphical user interface;
determine, by a machine learning model, a per-pixel score for each pixel within the region, wherein, for each pixel, the per-pixel score indicates a likelihood that the pixel is included in the object;
determine a boundary of the object within the region based on the per-pixel scores for pixels within the region;
receive a boundary parameter that indicates a score threshold to be applied to per-pixel scores of the pixels of the region;
determine a portion of the region that includes the object by applying the score threshold to the per-pixel scores of the pixels, wherein only pixels having per-pixel scores which exceed the score threshold are included in the portion;
receive a second boundary parameter that indicates a second score threshold to be applied to per-pixel scores of the pixels of the region, wherein the second score threshold is different from the score threshold;
determine a second portion of the region that includes the object by applying the second score threshold to the per-pixel scores of the pixels, wherein only pixels having per-pixel scores which exceed the second score threshold are included in the second portion; and
via the graphical user interface, display the portion upon selection of the boundary parameter by the user and display the second portion upon selection of the second boundary parameter by the user.

9. One or more non-transitory computer-readable media storing instructions that, when executed by one or more processors, cause the one or more processors to perform the steps of:
receiving an image and an indication of a region within the image, wherein the region identifies an outermost portion of the image where pixels of an object are likely to occur, wherein the indication comprises a bounding box drawn by a user via a graphical user interface;
determining, by a machine learning model, a per-pixel score for each pixel within the region, wherein, for each pixel, the per-pixel score indicates a likelihood that the pixel is included in the object;
determining a boundary of the object within the region based on the per-pixel scores for pixels within the region;
receiving a boundary parameter that indicates a score threshold to be applied to per-pixel scores of the pixels of the region;
determining a portion of the region that includes the object by applying the score threshold to the per-pixel scores of the pixels, wherein only pixels having per-pixel scores which exceed the score threshold are included in the portion;
receiving a second boundary parameter that indicates a second score threshold to be applied to per-pixel scores of the pixels of the region, wherein the second score threshold is different from the score threshold;
determining a second portion of the region that includes the object by applying the second score threshold to the per-pixel scores of the pixels, wherein only pixels having per-pixel scores which exceed the second score threshold are included in the second portion; and
via the graphical user interface, displaying the portion upon selection of the boundary parameter by the user and displaying the second portion upon selection of the second boundary parameter by the user.

\* \* \* \* \*